United States Patent [19]

Kajimura et al.

[11] Patent Number: 5,231,286
[45] Date of Patent: Jul. 27, 1993

[54] SCANNING PROBE MICROSCOPE UTILIZING AN OPTICAL ELEMNT IN A WAVEGUIDE FOR DIVIDING THE CENTER PART OF THE LASER BEAM PERPENDICULAR TO THE WAVEGUIDE

[75] Inventors: Hiroshi Kajimura; Jun Funazaki; Hideo Tomabechi; Hiroshi Tazaki; Keisuke Saito, all of Tokyo; Yasushi Nakamura, Yamanashi, all of Japan

[73] Assignee: Olympus Optical Co., Ltd., Tokyo, Japan

[21] Appl. No.: 748,687

[22] Filed: Aug. 22, 1991

[30] Foreign Application Priority Data

Aug. 31, 1990 [JP] Japan .................................. 2-230100
Oct. 26, 1990 [JP] Japan .................................. 2-286981

[51] Int. Cl.$^5$ ............................................. H01J 3/14
[52] U.S. Cl. ..................................... 250/234; 250/306
[58] Field of Search ............... 250/216, 234, 306, 307, 250/328

[56] References Cited

U.S. PATENT DOCUMENTS

Re. 33,387 10/1990 Binnig ................................. 250/306
5,025,147 6/1991 Dürig et al. ......................... 250/306
5,060,248 10/1991 Dumoulin ........................... 250/306

OTHER PUBLICATIONS

"Surface Studies by Scanning Tunneling Microscopy", Physical Review Letters, Jul. 5, 1982, vol. 49, No. 1, pp. 57-61.
"Atomics Force Microscope", Physical Review Letters, Mar. 3, 1986, vol. 56, No. 9, pp. 930-934.
Appl. Phys. Lett. 53 (12), Sep. 19, 1988, 1045-1047 "Novel Optical Approach to Atomic Force Microscopy".

Primary Examiner—David C. Nelms
Assistant Examiner—T. Davenport
Attorney, Agent, or Firm—Frishauf, Holtz, Goodman & Woodward

[57] ABSTRACT

A scanning probe microscope according to the present invention comprises a cantilever having a free end portion and a fixed end portion, the free end portion bearing a probe thereon, a semiconductor laser attached to the fixed end portion of the cantilever, an optical waveguide for guiding a laser beam, emitted from the semiconductor laser, to the free end portion, an optical element for dividing part of a center beam of the laser beam, guided through the optical waveguide, into laser beams in at least two perpendicular directions, a photoelectric transducer for receiving the divided laser beams and converting the laser beams into electrical output signals corresponding thereto, and a differential circuit for receiving the electrical signals and subjecting the signals to predetermined arithmetic processing, thereby detecting a three-dimensional displacement of the free end portion of the cantilever.

14 Claims, 8 Drawing Sheets

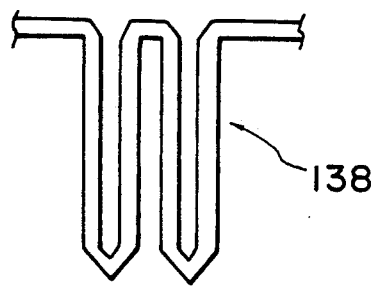
F I G. 9
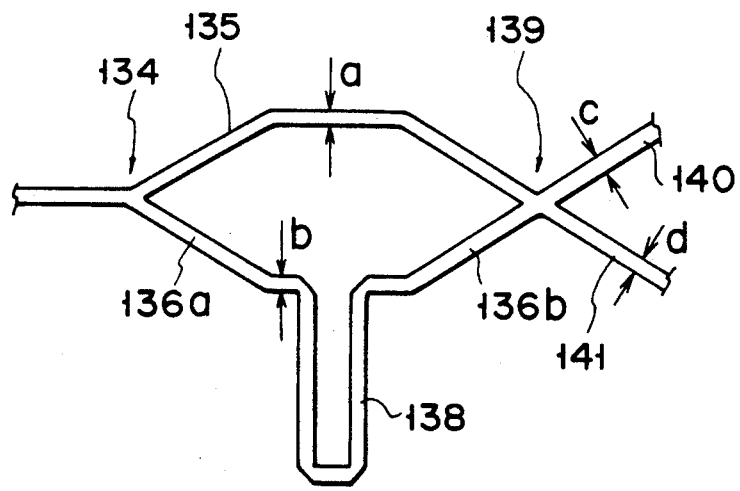
F I G. 10

SCANNING PROBE MICROSCOPE UTILIZING AN OPTICAL ELEMNT IN A WAVEGUIDE FOR DIVIDING THE CENTER PART OF THE LASER BEAM PERPENDICULAR TO THE WAVEGUIDE

BACKGROUND OF THE INVENTION

1. Field of the Invention

The present invention relates to scanning probe microscopes used for the observation of a fine surface configuration of a sample.

2. Description of the Related Art

Well-known microscopes of this type include a scanning tunneling microscope (STM), atomic force microscope (AFM), magnetic force microscope (MFM), etc.

The STM, which is an apparatus proposed by Binnig or Rohrer et al. in 1982, can observe the surface configuration of a electrically conductive sample in atomic order. The details of this apparatus are described in "G. Binnig, H. Rohrer, Ch. Gerber, and E. Weibel; Surface Studies by Scanning Tunneling Microscope, Phys. Rev. Lett., Vol. 49 57 (1982)." The STM has an electrically conductive probe, which is supported in the vicinity of the conductive sample. When a voltage is applied between the probe and the sample after the tip end of the probe is brought to a position at a fine distance of about 1 nm from the sample surface, a tunnel electric current flows between the probe and the sample. This tunnel current changes depending on the distance between the probe and the sample, and its value changes substantially by a figure as the distance changes by 0.1 nm.

The probe is moved (e.g., for raster scanning) along the sample surface. During this movement, a control voltage is applied to a piezoelectric body so that the value of the tunnel electric current flowing between the probe and the sample is constant. By doing this, the distance between the probe and the sample can be kept fixed. Accordingly, the tip end of the probe is displaced following the surface configuration of the sample. Position data corresponding to this displacement of the probe end is calculated according to the control voltage applied to the piezoelectric body. A three-dimensional image of the sample surface is detected on the basis of this calculated data.

The AFM is proposed as an apparatus through which the surface configuration of an insulator can be observed in atomic order. The details of this apparatus are described in "G. Binnig, C.F. Quate; Atomic Force Microscope, Phys. Rev. Lett., Vol. 56 930 (1986)."

In the AFM, a probe is supported by means of a flexible cantilever. When the probe is brought close to the surface of a sample, an attraction is produced between atoms of the probe end and those of the sample surface by a Van der Waals interaction. If the probe is brought closer to the sample surface so that the distance between them is substantially equal to the atomic distance or bond length, a repulsive force based on the Pauli exclusion principle acts between the atoms of the probe end and the sample surface. The attraction and the repulsive force (atomic force) are as small as $10^{-9}$ to $10^{-12}$ N. When the atoms of the probe end are subjected to the atomic force, the cantilever is displaced for a distance corresponding to the magnitude of the force. When the probe is moved along the sample surface to scan it, the distance between the probe and the sample changes depending on the irregularity of the sample surface, whereupon the cantilever is displaced. This displacement of the cantilever is detected, and the piezoelectric body or some other inching element is feedback-controlled to keep the cantilever's displacement constant. Since the voltage then applied to the piezoelectric body is changed corresponding to the surface configuration of the sample, an irregularity image of the sample surface is detected in accordance information on the applied voltage.

The MFM, which has a probe formed of a magnetic material, is basically constructed in the same manner as the AFM. Like the AFM, the MFM is designed so that an irregularity image of the surface of a sample is detected by scanning the sample surface by means of the probe in a manner such that a magnetic force acting between the probe and magnetic particles is kept constant.

The AFM or MFM can be also used as an STM if the probe on the cantilever used therein is formed of an electrically conductive material such that the tunnel electric current can be detected thereby.

Referring now to FIGS. 13 and 14, the cantilever used in each of the aforementioned microscopes will be described. In these drawings, numeral 1 denotes the cantilever which is made of $SiO_2$ (or $Si_3N_4$) and is rectangular in external shape.

As shown in FIG. 13, a fixed end portion (hereinafter referred to as base portion b) of the cantilever 1 is mounted on a Pyrex member 2. A probe 3 protrudes downward for a fine distance from the underside of the free end portion of the cantilever 1, on the opposite side thereof to the base portion b. The probe 3 is formed in the following manner.

First, $SiO_2$ is deposited on the cantilever 1. Then, an opening mask is disposed over the deposited surface of the cantilever, at a distance substantially equal to the length of the probe therefrom. Then, a deposition material is built up on the cantilever 1 from above the opening mask so that it forms a cone tapered toward the center. In order to obtain a large displacement against a very small force, such as an atomic or magnetic force, moreover, the cantilever 1 is formed of a thin plate of a material which is as light in weight as possible and has a modulus of elasticity as high as possible.

If an external force F is applied to a free end portion of a cantilever spring which has a thickness a, base width b, and length l, a displacement $\epsilon_V$ of the free end portion with respect to a Z direction (see FIGS. 13 and 14) is given by $$\epsilon_V = 4l^3 F / a^3 b E, \quad (1)$$

and a Y-direction $\epsilon_H$ is given by $$\epsilon_H = 4l^3 F / a b^3 E, \quad (2)$$

where E is the modulus of longitudinal elasticity.

In equations (1) and (2), the values $\epsilon_V$ and $\epsilon_H$ can be made larger by increasing l and reducing a and b.

If the cantilever 1 is lengthened in this manner, its effective mass increases, and its natural frequency lowers, so that its follow-up performance is lowered when it is used to scan the sample surface.

The natural frequency $f_0$ of the elastic material may be calculated according to $$f_0 = (E/m_0)^{\frac{1}{2}} / 2\pi, \quad (3)$$

where $m_0$ is the load (i.e., effective mass) of the elastic material.

As seen from equation (3), the effective mass of the cantilever 1 can be reduced by forming its whole body into a thin, narrow rectangular structure and reducing the size of the probe 3 at the free end portion of the cantilever. As a result, the natural frequency of the cantilever increases, and the follow-up performance is improved.

Usually, the thickness (a), base width (b), length (l) of the cantilever are 0.3 or 0.6 μm, 80 or 120 μm, and 100 or 200 μm, respectively. The length of the probe is about 2 μm.

If the probe 3 is too short, however, the face of the cantilever 1 and the lower surface of the Pyrex member 2 are brought as close as about 2 μm to the sample when the tip end of the probe approaches the sample to a distance of about 0.1 to 10 nm therefrom. As a result, the cantilever 1 may possibly run against the sample to be observed when the sample surface is irregular, in particular.

Accordingly, the probe 3 must have a sufficient length, in order to measure the sample surface with a long enough distance kept between the sample and the cantilever 1 lest the cantilever run against the sample.

If the probe 3 is too long, however, the mass of the cantilever 1 inevitably increases. When the probe 3, thus long, is moved along the sample surface to scan it, moreover, the position of the tip end of the probe 3 is bound to be shifted toward the sample surface (e.g., in the direction of arrow R of FIG. 14) by an intermolecular attraction from the sample, acting on the probe end, or an atomic force, such as a Van der Waals force. Such an awkward situation causes errors in measurement results.

A novel method has been proposed to solve this problem. According to this method, the base width (b) of the cantilever 1 is increased to reduce the amount of torsional rotation in the R direction (see FIG. 14).

The relationship between a turning moment (T), which is caused when a shearing force acts on the free end portion of the cantilever 1 through the probe 3, and a torsional angle θ (see FIG. 14) of the free end portion of the cantilever may be expressed as follows:

$$\theta = 3lT/a^3bG, \quad (4)$$

where G is the modulus of transverse elasticity.

In connection with this, a shift amount ΔM of the probe end is calculated according to $$\Delta M = d\sin\theta. \quad (5)$$

Even though the base width (b) is increased as aforesaid, however, the influence of the shearing force cannot be thoroughly removed. Since the increase of the base width (b) entails the increase of the mass of the cantilever 1, moreover, the natural frequency of the cantilever and its follow-up performance for the irregularity of the sample surface lower.

In the microscopes described above, the following two types of optical sensing systems are conventionally used as means for detecting the displacement of the cantilever 1.

In a first sensing system, an optical reflective surface is provided at the free end portion of the cantilever 1 and a ruby solid laser beam or an argon gas laser beam is applied to the reflective surface through a fiber. A change of the angle of reflection of the cantilever is detected by detecting the light beam reflected by the reflective surface, by means of an optical position sensor.

In a second sensing system, a laser beam emitted from a light source similar to the one used in the first sensing system is divided in two, a reference light beam and an incident light beam on the optical reflective surface. The reference light beam is caused to interfere with the reflected light beam from the reflective surface, and the displacement of the cantilever is detected by photoelectrically converting the resulting coherent output.

In these displacement sensing systems, however, the light beam applied to the cantilever is fully narrowed down, so that a large number of relatively large-sized optical elements are needed. As a result, the sensing system is large-sized and complicated in construction.

Since the alignment of an optical system has a great influence on the measurement accuracy, moreover, fine readjustment for the optical system alignment, which is required when the probe or cantilever is replaced with a new one, is a highly delicate job.

SUMMARY OF THE INVENTION

An object of the present invention is to provide a scanning probe microscope which can precisely measure the surface of a sample by accurately detecting a displacement and torsional angle of a cantilever attributable to an external force, such as an atomic force, acting on a probe.

Another object of the present invention is to provide a scanning probe microscope which has a simple sensing system for detecting the displacement and torsional angle of the cantilever, and requires no alignment of an optical system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9 is a plan view showing a modification of a sensor waveguide attached to the displacement sensing head shown in FIG. 7;

FIG. 10 is a plan view showing a modification of an optical waveguide attached to the displacement sensing head shown in FIG. 7;

DETAILED DESCRIPTION OF THE PREFERRED EMBODIMENTS

Figure 1:
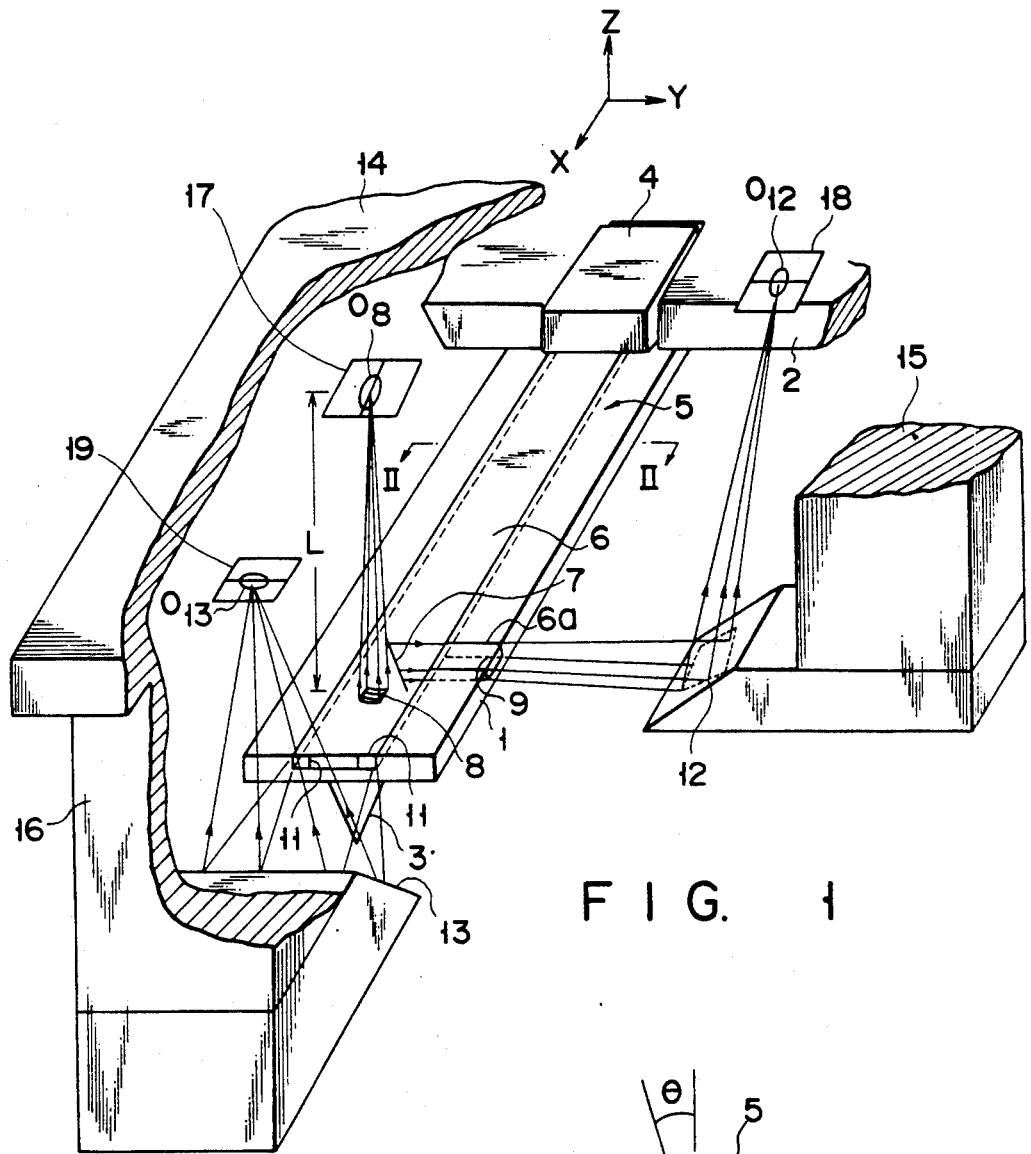
FIG. 1 is a cutaway perspective view schematically showing a scanning probe microscope according to a first embodiment of the present invention.

Referring now to FIGS. 1 to 5, a scanning probe microscope according to a first embodiment of the present invention will be described in detail.

As shown in FIGS. 1 to 4, a Pyrex member 2 is provided with a semiconductor laser 4. A fixed end portion of a cantilever 1, in the form of a thin rectangular plate, is optically connected to a laser emitting opening (not shown) of the laser 4. An optical waveguide 6, which extends from the fixed end portion to a free end portion of the cantilever 1, is provided on the upper surface side of the central portion of the cantilever. Openings 11 are formed individually on the opposite sides of an extending end face of a free end portion of the optical waveguide 6. Thus, a laser beam 5 emitted from the semiconductor laser 4 is applied through the openings 11 to a concave mirror 13, which will be mentioned later.

A half mirror 7 and a Fresnel lens body 8 are formed on the upper surface of the optical waveguide 6 near the free end portion thereof. The mirror 7 has a transmittance of 50%, and is inclined at an angle of 45° to the longitudinal axis of the waveguide 6. The lens body 8, which is in the form of a prism or Fresnel lens, has a function to converge part of the laser beam 5, transmitted through the half mirror 7, onto a bisected photoelectric transducer 17, which will be mentioned later. Both the mirror 7 and the Fresnel lens body 8 are formed by working the optical waveguide 6 by means of an electron-beam drawing apparatus (not shown). On the reflective surface side of the mirror 7, moreover, an optical waveguide 6a extends at right angles to the longitudinal axis of the cantilever from the optical waveguide 6. The waveguide 6a, which has an opening 9 in its extending end face, serves to apply the laser beam 5, reflected by the half mirror 7, to a concave mirror 12, which will be mentioned later. A probe 3 with a sharp tip end is attached to the lower surface of the free end portion of the cantilever 1.

Bisected photoelectric transducers 18 and 19 are arranged perpendicularly over the concave mirrors 12 and 13, respectively, so as to face the same. Also, the bisected photoelectric transducer 17 is located facing the Fresnel lens body 8. The distance between the lens body 8 and the transducer 17 is adjusted to the focal length (L) of the lens body 8.

The concave mirrors 12 and 13 are mounted on blocks 15 and 16, respectively. Preferably, they are mounted by anodic bonding. All the bisected photoelectric transducers 17, 18 and 19 are mounted on the inside (or the side facing the optical waveguide 6) of a silicon substrate 14, which is supported by means of the blocks 15 and 16. Also, the Pyrex member 2 is attached to the inside of the substrate 14 by means of a spacer or a piezoelectric driver 21 (see FIG. 3).

The curvature of each of the concave mirrors 12 and 13 is adjusted so as to correspond to the distance L through which a center beam Bc (see FIG. 2), refracted by the Fresnel lens body 8, travels to be focused on the photoelectric transducer 17. The inner surface of the silicon substrate 14 is situated on the respective focusing positions of the mirrors 12 and 13 and the lens body 8. The bisected photoelectric transducers 17, 18 and 19 are arranged on the inner surface of the substrate 14. The elements 17, 18 and 19 are oriented so that their respective lines of bisection extend parallel to, perpendicular to, and perpendicularly across the longitudinal axis of the cantilever 1, respectively.

Figure 3:
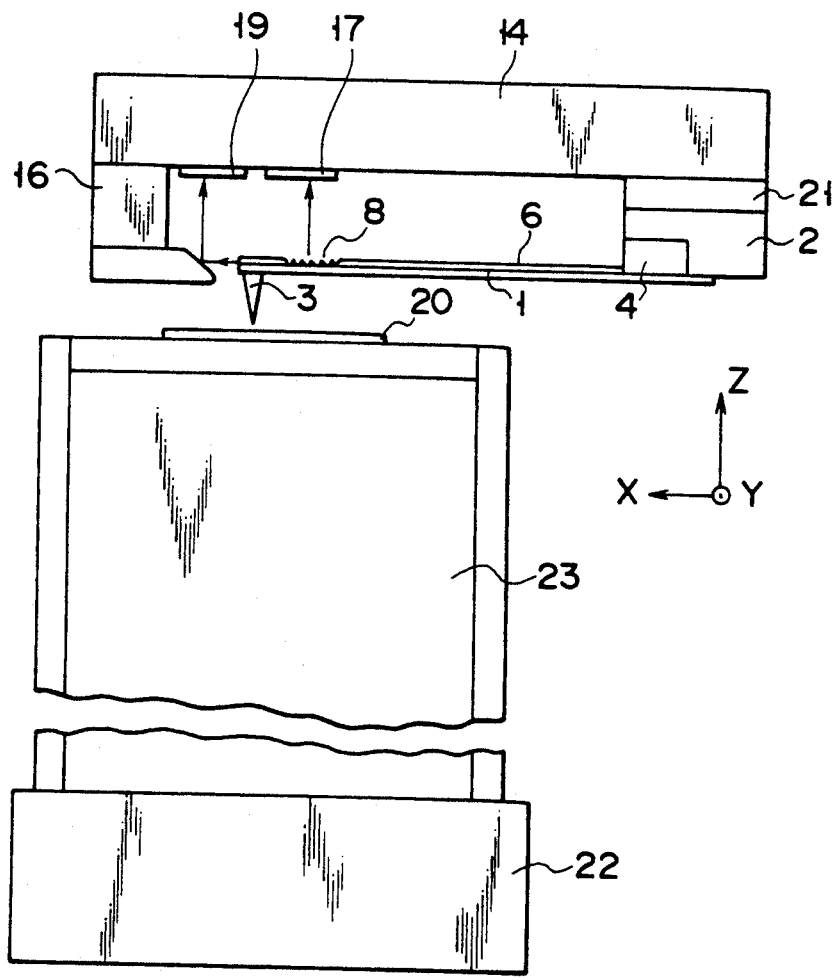
FIG. 3 is a side view of the scanning probe microscope shown in FIG. 1.

As shown in FIG. 3, the scanning probe microscope according to the present embodiment is provided with a three-dimensional inching device 23 on which a sample 20 can be placed. The device 23, which serves to keep the distance between the probe 3 and the sample 20 constant, is supported on a Z-direction rough movement device 22. The device 22 serves to move the sample 20 in a Z direction through the medium of the inching device 23.

The following is a brief description of a method for manufacturing the principal structure of the scanning probe microscope arranged in this manner.

Conventional pin-type photoelectric diodes are used individually as the bisected photoelectric transducers 17, 18 and 19. For uniform properties, these transducers 17, 18 and 19 are formed in pairs and bonded to the silicon substrate 14. Alternatively, an optical sensing element of another type, along with a circuit for amplifying the detection output or a circuit for signal discrimination, may be formed directly on the substrate.

Figure 4:
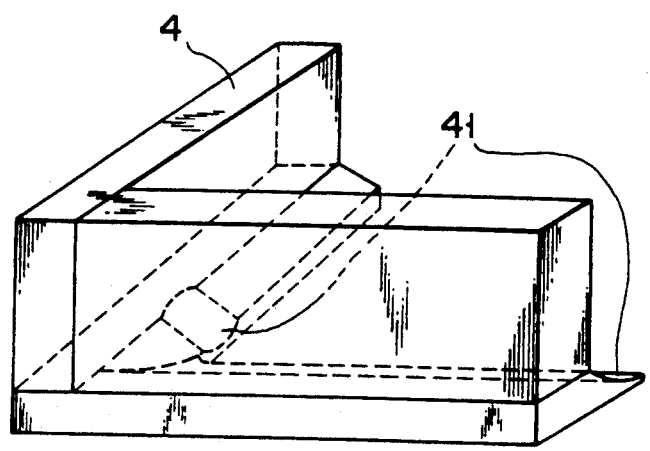
FIG. 4 is a perspective view of a concave mirror used in the scanning probe microscope shown in FIG. 1.
Figure 5:
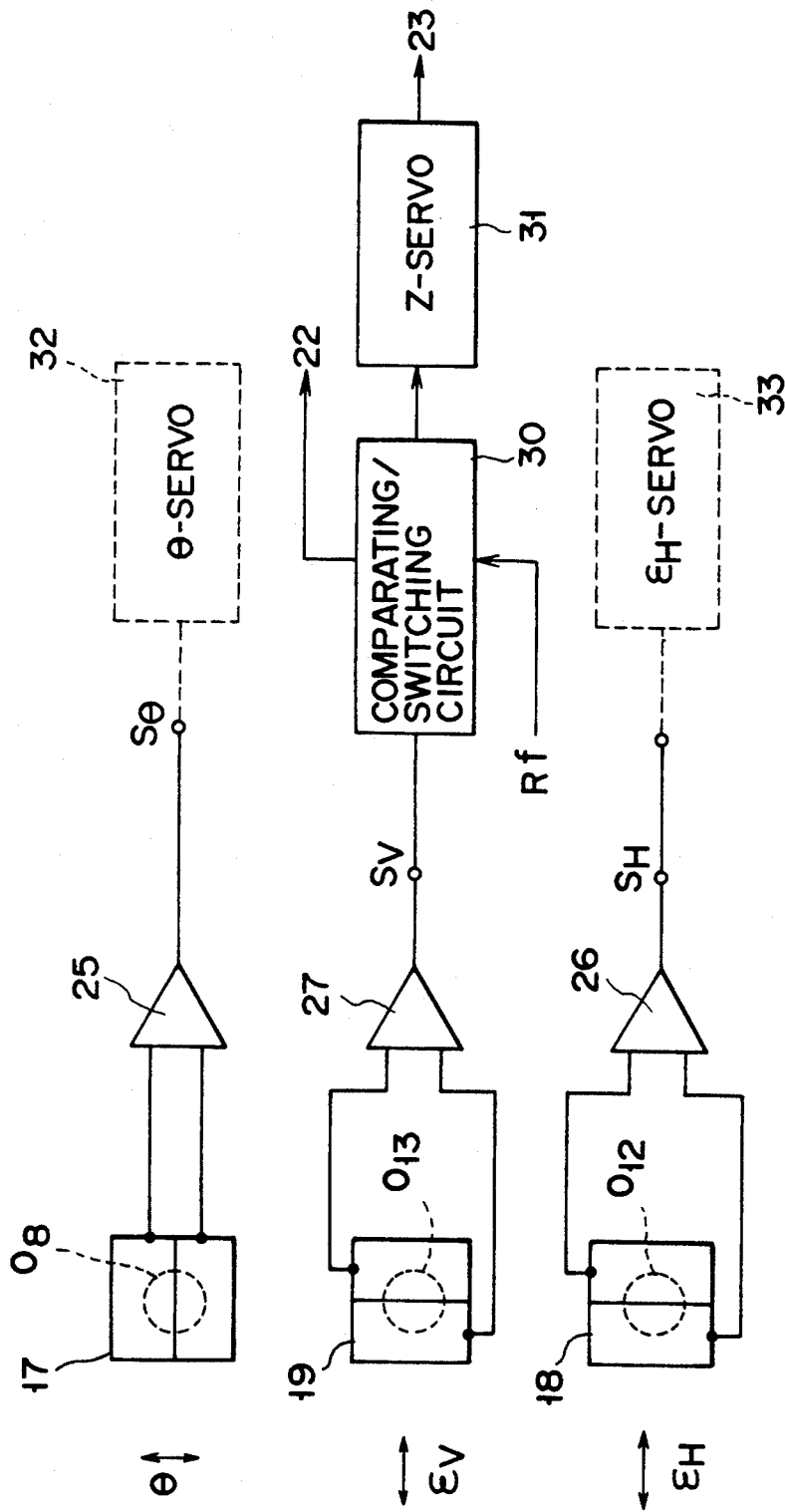
FIG. 5 is a block diagram showing an arrangement of a sensing system in the scanning probe microscope shown in FIG. 1.

A micro-mirrors or an L-shaped glass member 40 (see FIG. 4) is used as each of the concave mirrors 12 and 13. The mirrors 12 and 13 are each worked into a plate member of a size such that they do not interfere with the cantilever 1 and the Pyrex member 2. The concave surface of each mirror need not always be a spherical surface, and may alternatively be a cylindrical surface (designated by numeral 41), as shown in FIG. 4.

The cantilever 1 is formed by depositing $SiO_2$ (or $Si_3N_4$) on a silicon substrate by with the aid of a rectangular mask pattern and then removing it by anisotropic etching.

The probe 3 is formed in the following manner. After $SiO_2$ (or $Si_3N_4$) is first deposited on the cantilever 1, an opening mask is disposed over the underside of the free end portion of the cantilever, at a distance substantially equal to the length of the probe therefrom. Then, a deposition material is built up on the cantilever 1 from above the opening mask so that the tip end of the resulting probe is in the form of a sharp cone.

The optical waveguide 6 is formed by depositing Corning-7059 glass (refractive index: 1.5) on the substrate of the cantilever 1 with $SiO_2$ (refractive index: 1.5) thereon by the sputtering process. Formed in this manner, the waveguide 6 utilizes the peculiarity of a light wave to be propagated to a higher-refraction region.

Figure 2:
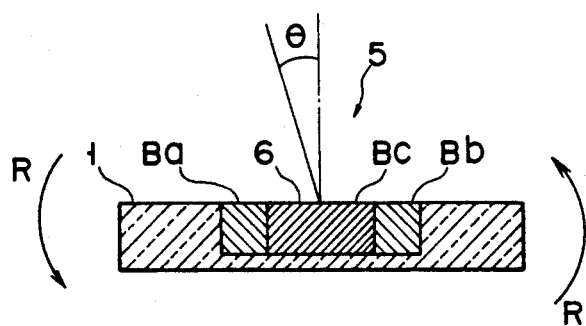
FIG. 2 is a sectional view taken along line II—II of FIG. 1.

In the scanning probe microscope constructed in this manner, the laser beam 5 emitted from the semiconductor laser 4 is guided through the optical waveguide 6 toward the free end portion thereof. The cross section of the laser beam 5 transmitted through the waveguide 6 is shown in the sectional view of FIG. 2 taken along line II—II of FIG. 1. As shown in FIG. 2, the laser beam 5 propagated through the waveguide 6 is split into three beams, the center beam Bc and side beams Ba and Bb. The cross-sectional area of the center beam Bc accounts for about 70% of the total cross-sectional area of the laser beam 5, and that of each of the side beams Ba and Bb for about 15%. When the laser beam 5 reaches a position near the free end portion in this state, 50% of the center beam Bc is reflected by the half mirror 7, while the remaining 50% is transmitted through the mirror 7. The side beams Ba and Bb are guided to the free end portion of the optical waveguide 6 without being influenced by the mirror 7. That portion of the center beam Bc which is reflected by the half mirror 7 is landed onto the concave mirror 12 through the waveguide 6. The center beam portion incident on the mirror 12 is condensed into a specific beam spot $O_{12}$ on the bisected photoelectric transducer 18. On the other hand, that the center beam Bc which is transmitted through the half mirror 7 is landed onto the Fresnel lens body 8 of 90° reflection angle. The center beam Bc incident on the lens body 8 is condensed into a specific beam spot $O_8$ on the bisected photoelectric transducer 17. The side beams Ba and Bb guided to the free end portion emerge from the opening 11 and is landed onto the concave mirror 13. The beams Ba and Bb reflected by the mirror 13 is condensed into a specific beam spot $O_{13}$ on the bisected photoelectric transducer 19.

The bisected photoelectric transducers 17, 18 and 19 serve to deliver electrical signals corresponding to the beam spots $O_8$, $O_{12}$ and $O_{13}$ to differential circuits 25, 26 and 27, respectively. On receiving these electrical signals, the circuits 25, 26 and 27 output differential signals $S_\theta$, $S_H$ and $S_V$, respectively. The differential signal $S_V$ is applied to a comparing-switching circuit 30 to which receives a reference signal Rf as an input signal. On receiving the signal $S_V$, the circuit 30 stops the operation of the rough movement device 22, and actuates a Z-servo 31 to drive the three-dimensional inching device 23. The differential signals $S_\theta$ and $S_H$ are delivered as required to a $\theta$-servo 32 and an $\epsilon$-servo 33, respectively, whereby the probe 3 is servo-controlled with respect to the Z direction and an XY direction.

These bisected photoelectric transducers 17, 18 and 19 each have a function to detect the displacement of the cantilever 1. More specifically, the transducer 17 serves to detect an R-direction torsional angle $\theta$ (see FIG. 2) caused by a turning moment T which acts on the cantilever 1. The transducers 18 and 19 serve to detect a Y-direction displacement $\epsilon_H$ and a Z-direction displacement $\epsilon_V$, respectively, of the cantilever 1. Thus, the displacements of the cantilever 1 are detected in a three-dimensional manner.

The following is a description of the operation of the scanning probe microscope arranged in this manner.

In an initial state such that the probe 3 of the cantilever 1 is off the sample 20 (see FIG. 3), the beam spots $O_8$, $O_{12}$ and $O_{13}$ are formed symmetrically with respect to the lines of bisection of the bisected photoelectric transducers 17, 18 and 19, respectively. Thus, equivalent electrical signals are applied to the differential circuits 25, 26 and 27.

As in the operation of the conventional STM, the rough movement device 22 is operated to move the sample 20 in the Z direction (see FIG. 3) so that the sample approaches the probe 3 of the cantilever 1. At this time, a Van der Waals force acts to produce an attraction between the probe 3 and the sample 20. As a result, the free end portion of the cantilever 1 is attracted by the attractive force, thereby descending for a displacement $\epsilon_1$ in the Z direction. Thereafter, the cantilever 1 is kept in a state such that its restoring force and the attraction are balanced with each other. In this balanced state, the attraction region of the cantilever 1 is set on the basis of a displacement $\epsilon_1 = \epsilon_1$ of the cantilever calculated in consideration of the properties of the cantilever. If the sample 20 is brought closer to the probe 3, a repulsive force based on the Pauli exclusion principle acts between the sample 20 and the probe 3. At this time, the free end portion of the cantilever 1 is pushed back for a displacement $\epsilon_1 = \epsilon_{R1}$, which is smaller than $\epsilon_1 = \epsilon_I$, within a distance $D = D_{R1}$ between the sample 20 and the probe 3. When the sample 20 is brought further closer to the probe 3, the repulsive force surpasses the attraction, thus pushing up the free end portion of the cantilever 1 beyond its initial position. A displacement $\epsilon_1 = -\epsilon_{R2}$ for this push-up defines a repulsion region to which the Pauli exclusion principle applies. These displacements $\epsilon_{R1}$ and $-\epsilon_{R2}$ are also calculated in consideration of the properties of the cantilever 1.

The beams Ba and Bb emitted from the opening 11 are condensed on the bisected photoelectric transducer 19, corresponding to the displacement $\epsilon_1$. In this case, the beam spot 0 13 is deviated with respect to the line of bisection of the transducer 19. Therefore, two electrical signals delivered individually from the two regions of the photoelectric transducer 19 are different from each other. These signals are applied individually to the input of the differential circuit 27 (see FIG. 5). The circuit 27 compares the two input signals, and delivers a differential signal $S_1$ which corresponds to the displacement $\epsilon_1$. In like manner, the circuit 27 delivers differential signals $S_I$, $S_{R1}$ and $S_{R2}$ which correspond to the displacements $\epsilon_I$, $\epsilon_{R1}$ and $\epsilon_{R2}$, respectively. The differential signal $S_1$ corresponding to the $\epsilon_1$ is applied to the input of the comparing-switching circuit 30. The circuit 30 compares the input signal $S_1$ and the reference signal $Rf = S_{R1}$ ($f = 1$). As a result, the displacement $\epsilon_1 = \epsilon_{R1}$ is detected, for example.

The comparing-switching circuit 30 stops the operation of the Z-direction rough movement device 22, and actuates the Z-servo 31 to drive the three-dimensional inching device 23 (see FIG. 3). As a result, the probe 3 is servo-controlled so that the distance between the probe and the sample 20 is constant. The inching device 23 driven by operating a cylindrical actuator or a tripod piezoelectric body in the Z direction.

Subsequently, the three-dimensional inching device 23 is driven in the XY direction so that the cantilever 1 is kept within the aforesaid repulsion region, whereby the probe 3 is moved along the surface of the sample 20 to scan it. In consequence, an atomic force (i.e., external force (F)) acts between the tip end of the probe 3 and the sample 20 located in the region right under the probe and in the vicinity thereof. Thus, the tip end of the probe 3 is kept at a fixed distance from the surface of the sample 20. Accordingly, the cantilever 1 is displaced so as to follow the surface configuration of the sample 20. This displacement is calculated as follows:

$$\epsilon_V = 4l^3F/a^3bE, \quad (1)$$

$$\epsilon_H = 4l^3F/ab^3E, \quad (2)$$

$$\theta = 3lT/a^3bG, \quad (4)$$

$$\Delta M = d\sin\theta. \quad (5)$$

Here a, b and l are the thickness, width, and length, respectively, of the cantilever 1, E is the modulus of longitudinal elasticity, and G is the modulus of transverse elasticity.

The Z-direction displacement ($\epsilon_V$), Y-direction displacement ($\epsilon_H$), torsional angle ($\theta$), and shift amount ($\Delta M$) are calculated according to equations (1), (2), (4) and (5), respectively. The natural frequency f $\theta$ of the cantilever 1 is given by $$f_0 = (E/m_0)^{\frac{1}{2}}/2\pi, \quad (3)$$

where $m_0$ is the effective mass of the cantilever.

If the cantilever 1 is subjected a torsion in an R direction (see FIG. 2), the beam spot $O_8$, formed on the bisected photoelectric transducer 17 by means of the Fresnel lens body 8, is shifted in a Y direction (see FIG. 1) with respect to the line of bisection of the transducer 17. At this time, different electrical signals are delivered from the photoelectric transducer 17 to the differential circuit 25 (see FIG. 5). Thereupon, the circuit 25 outputs the differential signal $S_\theta$ which corresponds to the shift amount. The torsional angle ($\theta$) can be detected by subjecting the signal $S_\theta$ to a specific arithmetic operation. The beam spots $O_{12}$ and $O_{13}$ on the bisected photoelectric transducers 18 and 19 are shifted in an X direction, corresponding to the torsional angle ($\theta$). As a result, different electrical signals are delivered from the photoelectric transducers 18 and 19 to the differential circuits 26 and 27 (see FIG. 5), respectively. The circuits 26 and 27 output differential signals $S_H$ and $S_V$, corresponding to the shift amount. The displacements $\epsilon_H$ and $\epsilon_V$ can be detected by subjecting the signals $S_H$ and $S_V$ to specific arithmetic operations. At this time, information on the irregularity of the sample surface, adsorptive force distribution image, etc. can be displayed by, for example, three-dimensionally displaying the differential signal $S_V$, $S_H$ or $S_\theta$ on a CRT in synchronism with an XY scanning signal.

Figure 6:
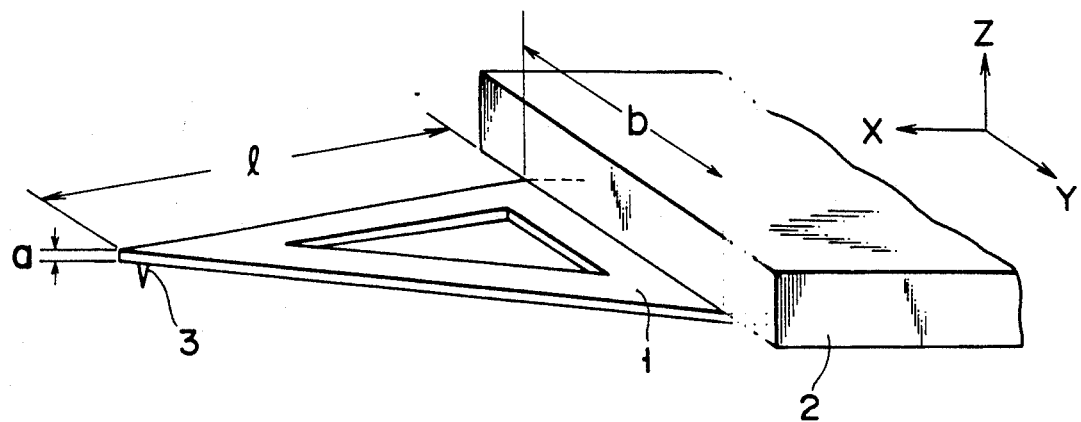
FIG. 6 is a perspective view showing a modification of the first embodiment in which the scanning probe microscope is provided with a hollow triangular cantilever.

The present invention is not limited to the first embodiment described above. In order to restore and hold the displacement $\epsilon_V$ and the torsional angle $\theta$ for a predetermined position, for example, the piezoelectric driver 21 may be designed so as to be controllable by means of the Z-servo 31 and the $\theta$-servo 32. With use of this arrangement, high-accuracy sample surface information can be detected corresponding to the differential signals $S_V$ and $S_\theta$. Although the rectangular cantilever has been described in connection with the first embodiment, moreover, the invention is not limited to this, and a hollow triangular cantilever may be used instead, as shown in FIG. 6. In this case, the calculations based on equations (1) to (4) are made in different manners.

Referring now to FIGS. 7 to 10, a scanning probe microscope according to a second embodiment of the present invention will be described.

Figure 7:
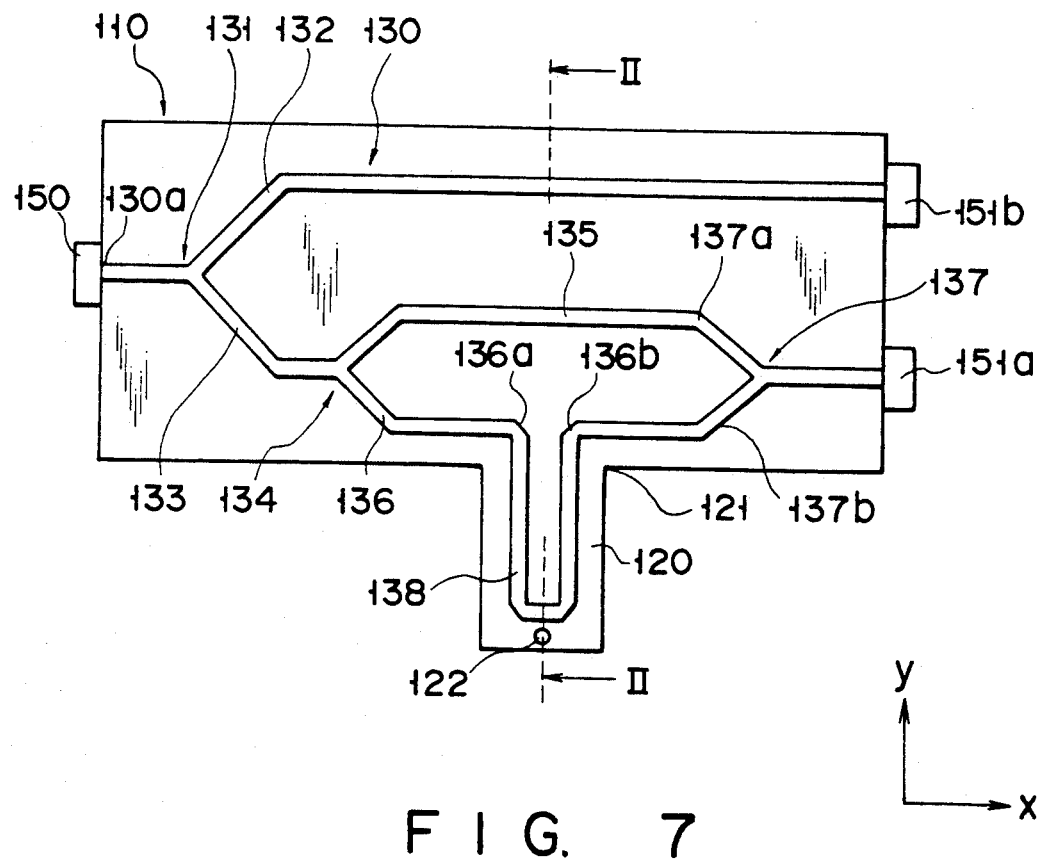
FIG. 7 is an enlarged plan view of a displacement sensing head used in a scanning probe microscope according to a second embodiment of the present invention.
Figure 8:
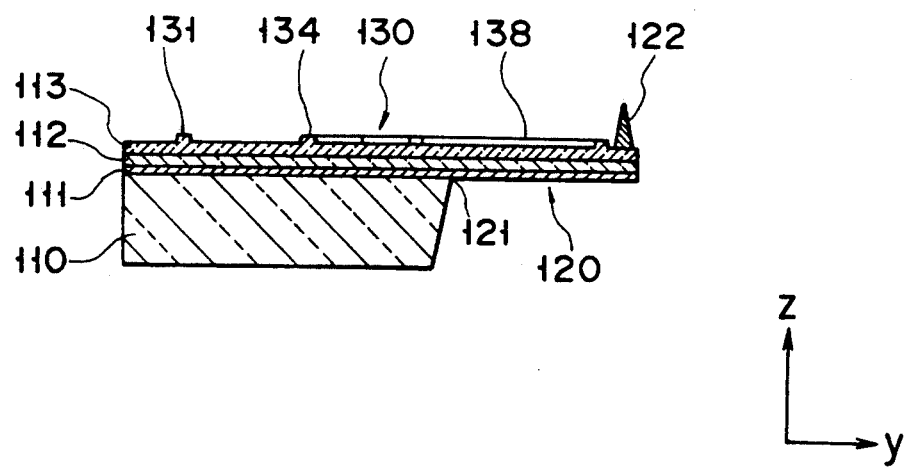
FIG. 8 is a sectional view taken along line II—II of FIG. 7.

As shown in FIGS. 7 and 8, the scanning probe microscope of the present embodiment is provided with a displacement sensing head which includes a cantilever 120 (only the head is shown in FIG. 7). A silicon layer 111 is formed integrally on a silicon substrate 110. That portion of the layer 111 which extends in the Y direction from the substrate 110 functions as the cantilever 120. A fixed end portion 121 of the cantilever 120 is integrally supported on the silicon substrate 110. A buffer layer 112, formed of silicon oxide, overlies the whole upper surface of the silicon layer 111. A glass layer 113 is disposed over the whole upper surface of the buffer layer 112. The layer 113 is formed with a glass pattern projecting in the Z direction. This pattern serves as a ridge-type optical waveguide 130. The layers 111, 112 and 113 and the waveguide 130 are formed by the methods mentioned later. A probe 122 having a sharp tip end is provided at the free end portion of the cantilever 120.

In the displacement sensing head constructed in this manner, a "Y-branch waveguide (Y-branch path)" is an optical waveguide which branches out in the shape of a Y, and a "Y-junction waveguide (Y-junction path)" is an optical waveguide which is unified in the shape of a Y. Branches of each waveguide diverge symmetrically.

The optical waveguide 130, which guides a laser beam emitted from a semiconductor laser 150 fixed to a substrate 110, is arranged on the substrate 110. Branch paths 132 and 133 diverge from a first Y-branch path 131 on the input side of the waveguide 130.

The one branch path 133 (i.e., first optical waveguide) leads to a second Y-branch path 134, from which diverge branch paths 135 and 136. The branch path 135 is optically connected to a Y-junction path 137 by means of a first input end 137a. The branch path 136 is optically connected to a U-shaped sensor waveguide 138 by means of an input-side end portion 136a on the substrate 110. The sensor waveguide 138, which is provided on the cantilever 120, constitutes a second optical waveguide. The waveguide 138 is optically connected to an output-side end portion 136b on the substrate 110 via the free end portion of the cantilever 20. The end portion 136b is optically connected to the Y-junction path 137 by means of a second input end 137b. The Y-junction path 137 is optically connected to a first photosensor 151a which is fixed to the substrate 110.

The other branch path 132, which diverges from the first Y-branch path 131, is optically connected to a second photosensor 151b, which is fixed to the substrate 110, without the interposition of the cantilever 120. A reference light beam is guided to the branch path 132. Fluctuations of the output power of the semiconductor laser 150 or the like can be detected by monitoring the reference light beam by means of the photosensor 151b.

The displacement sensing head is used to scan the surface of a sample (not shown) to be inspected, by means of a piezoelectric element. In doing this, the laser beam emitted from the semiconductor laser 150 is distributed in two directions by means of the first Y-branch path 131 of the optical waveguide 130. More specifically, one branch laser beam is distributed to the branch path 132, and the other to the branch path 133. The branch laser beam guided through the branch path 132 is delivered as a reference light beam to the second photosensor 151b, in order to monitor the influence of return light on the semiconductor laser 150, the fluctuations of the output power of the light source 150 due to other external causes, etc. The branch laser beam guided through the other branch path 133 is distributed to the branch paths 135 and 136 by means of the second Y-branch path 134. The laser beam distributed to the branch path 136 is guided to the sensor waveguide 138. Formed on the cantilever 120, the waveguide 138 is transformed as the cantilever is displaced. More specifically, the free end portion of the cantilever 120 is displaced in the vertical direction as a atomic force acts between the probe 122 and the sample surface. As a result, the sensor waveguide 138 is transformed. The laser beam guided through the waveguide 138 thus transformed changes its optical path length, due to a change of the dielectric constant, given by the product of a stress (caused by the transformation of the sensor measured without being influenced by the fluctuations of the output power of the semiconductor laser 150 or the like.

The sensor waveguide 138 of the present embodiment need not always be U-shaped, and may alternatively be W-shaped, as shown in FIG. 9, for example.

Further, the second photosensor 151b and the branch path 132 for guiding the reference light beam thereto are not essential. This is because the displacement of the free end portion of the cantilever 120 can be detected fully accurately on the basis of the change of the coherent light beam detected by means of the first photosensor 151a.

In the present embodiment, moreover, a Mach-Zehnder interferometer, which is provided with the second Y-branch path 134, the U-shaped sensor waveguide 138, and the Y-junction path 137, is used as an interference section for the signal light detection. It may, however, be replaced with a Michelson interferometer which is provided with an asymmetric X-branch path 139, as shown in FIG. 10, for example.

Referring now to FIG. 10, the Michelson interferometer will be described. Like reference numerals are used to designate the same portions as the counterparts of the second embodiment, and a description of those portions is omitted.

As shown in FIG. 10, two branch paths 135 and 136b, waveguide 138) and a photoelastic constant, or a change of the refractive index. The laser beam guided through the branch path 135, on the other hand, undergoes no change in its optical path length, since it bypasses the cantilever 120.

The respective wavefronts of the laser beams guided individually through the branch paths 135 and 136 overlap each other on the Y-junction path 137. If these two laser beams are of the same phase (i.e., if the free end portion of the cantilever 120 is not displaced), in this case, an incoherent light beam is applied to the first photosensor 151a. If the two laser beams have a difference in phase (i.e., if the free end portion of the cantilever 120 is displaced), on the other hand, a coherent light beam is applied to the photosensor 151a. The incoherent or coherent light beam applied to the first photosensor 151a is detected as a luminous intensity signal corresponding thereto. The displacement of the free end portion of the cantilever 120 is detected on the basis of a change of this luminous intensity signal. The surface configuration of the sample is measured according to the resulting detection data.

The scanning probe microscope according to the present embodiment is designed so as to compare the luminous intensity signals detected individually by means of the first and second photosensors 151a and 151b. Thus, the displacement of the cantilever 120 can be accurately which diverge from a Y-branch path 134, are optically connected by means of an X-branch path 139. Further, two branch paths 140 and 141 diverge from the path 139. The respective widths a, b, c and d of the branch paths 135, 136b, 140 and 141 have relationships c>a=b>d.

In the Michelson interferometer constructed in this manner, the respective wavefronts of laser beams transmitted through the branch paths 135 and 136b having the same width (a=b) overlap each other on the X-branch path 139. If these two laser beams are of the same phase (i.e., if the free end portion of the cantilever 120 is not displaced), in this case, an incoherent light beam is guided at 100% to the branch path 140 whose width (c) is greater than those of the branch paths 135 and 136b. If the two laser beams have a difference in phase (i.e., if the free end portion of the cantilever 120 is displaced), on the other hand, a coherent light beam is guided to the branch path 141 whose width (d) is smaller than those of the branch paths 135 and 136b. The coherent or incoherent light beam thus guided is detected by means of a photosensor (not shown), which is provided in the branch path 140 or 141. Based on the resulting detection data, the displacement of the free end portion of the cantilever 120 is detected, and the surface configuration of a sample is measured.

Figure 11:
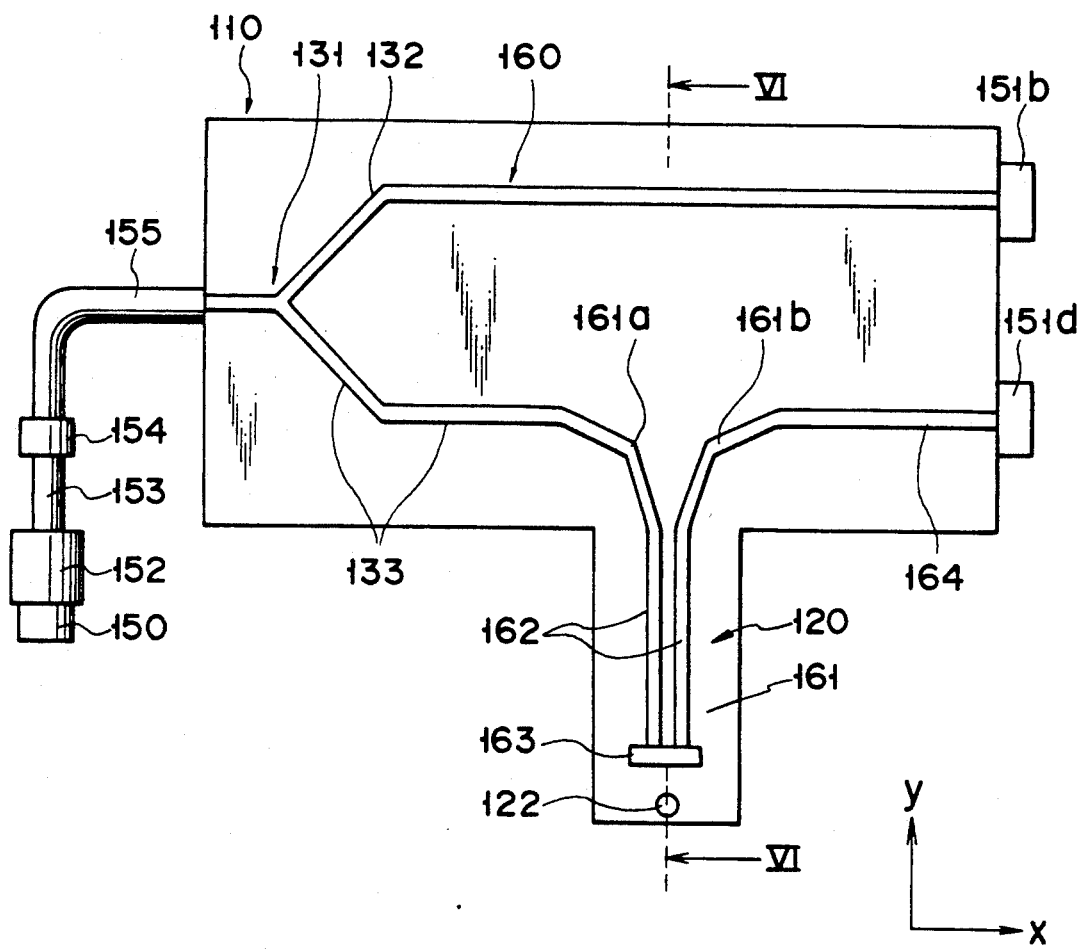
FIG. 11 is an enlarged plan view of a displacement sensing head used in a scanning probe microscope according to a third embodiment of the present invention.
Figure 12:
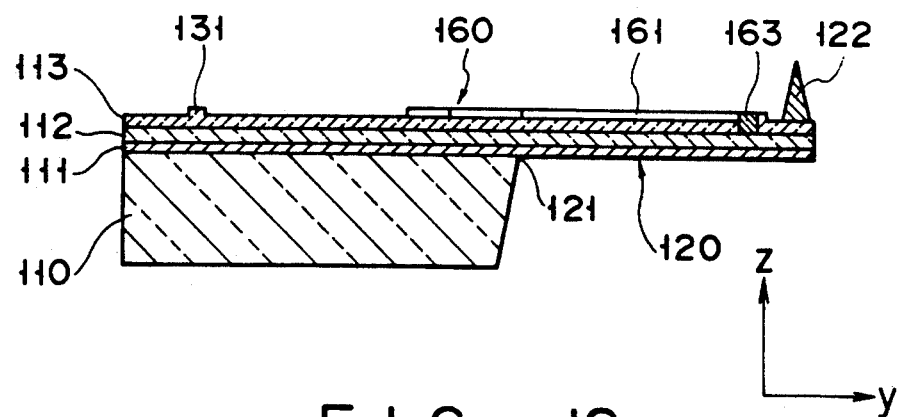
FIG. 12 is a sectional view taken along line VI—VI of FIG. 11.
Figure 13:
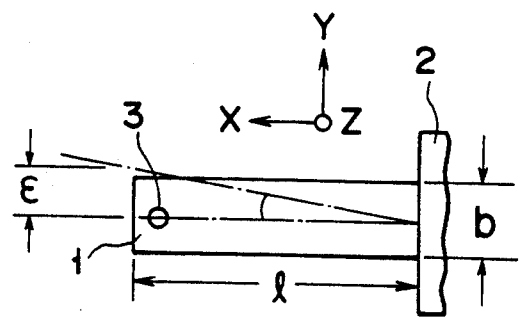
FIG. 13 is a bottom view showing a rectangular cantilever used in a prior art scanning probe microscope, the cantilever being mounted on a Pyrex member.
Figure 14:
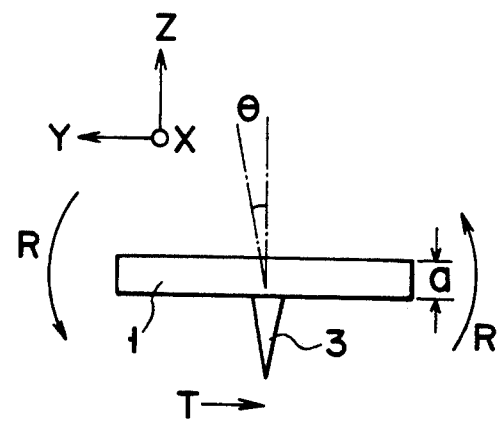
FIG. 14 is a front view of a free end portion of the cantilever shown in FIG. 13.

Referring now to FIGS. 11 and 12, a scanning probe microscope according to a third embodiment of the present invention will be described. In the description of the third embodiment to follow, like reference numerals are used to designate the same portions as the counterparts of the second embodiment, and a description of those portions is omitted. In the present embodiment, in contrast with the case of the second embodiment, a first photosensor 151a is designed so as to detect the luminous intensity of a laser beam emitted from a semiconductor laser 150.

The scanning probe microscope of the present embodiment is provided with a displacement sensing head which includes a cantilever 120 (only the head is shown in FIG. 11).

As shown in FIG. 11, the semiconductor laser 150 is optically connected to a ridge-type optical waveguide 160 via an optical isolator 152, an optical fiber 153, an optical fiber connector 154, and an optical fiber 155. As in the case of the second embodiment, the waveguide 160 is bifurcated so that two branch paths 132 and 133 diverge from a Y-branch path 131. The one branch path 132 extends over a substrate 110 without going by way of with the cantilever 120, and is optically connected to a second photosensor 151b. The other branch path (i.e., input-side waveguide) 133 is optically connected to an input-side end portion 161a of a reflector-type directional coupler 161, which is formed on the cantilever 120. The coupler 161 includes a pair of parallel waveguides 162, which extend over the cantilever 120, and a waveguide mirror 163 provided at the free end portion of the cantilever 120 so as to optically connect the waveguides 162. The mirror 163 is formed by etching a glass layer 113 and then depositing a metal, such as aluminum, on the etched layer. An output-side end portion 161b of the directional coupler 161 is optically connected to the first photosensor 151a by means of a waveguide (i.e., output-side waveguide) 164 on the substrate 110.

In the displacement sensing head constructed in this manner, the laser beam emitted from the semiconductor laser 150 is distributed in two directions by means of the Y-branch path 131. More specifically, one branch laser beam is distributed to the branch path 132, and the other to the branch path 133. As in the case of the second embodiment, the branch laser beam guided through the branch path 132 is delivered as a reference light beam to the photosensor 151b. The branch laser beam guided through the other branch path 133 is guided to the reflector-type directional coupler 161.

In the case of the present embodiment, the length of each of the parallel waveguides 162 of the reflector-type directional coupler 161 is half of the perfect union length. When the free end portion of the cantilever 120 is not displaced (or when it is not subjected to an atomic force), therefore, all the laser beam guided to the coupler 161 is guided to the first photosensor 151a. If the free end portion of the cantilever 120 is vertically displaced by an atomic force, on the other hand, the directional coupler 161 is transformed. Thus, the coupling state of the coupler 161 changes depending on the relationship between a change of the dielectric constant, given by the product of a stress (caused by the transformation of the coupler 161) and a photoelastic constant, or a change of the refractive index, and a change of the waveguide length. As a result, a luminous intensity signal detected by means of the first photosensor 151a cyclically changes. Thus, the displacement of the free end portion of the cantilever 120 can be detected in accordance with the change of the signal obtained by means of the photosensor 151a. In the present embodiment, as in the second embodiment, the displacement of the free end portion of the cantilever 120 can be measured with high accuracy by comparing the luminous intensity signal detected by means of the first photosensor 151a with one detected by means of the second photosensor 151b.

Also in the present embodiment, moreover, the second photosensor 151b and the branch path 132 for guiding the reference light beam thereto are not essential. This is because the displacement of the free end portion of the cantilever 120 can be detected fully accurately by detecting the change of the luminous intensity signal by means of the first photosensor 151a.

If the light source 150 is connected directly to the waveguide 160, furthermore, a reflected light beam to return to the semiconductor laser 150, besides a transmitted light guided to the first photosensor 151a, may possibly be generated, depending on the change of the coupling state of the directional coupler 161. In the present embodiment, therefore, the optical isolator 152 is provided on the emission side of the semiconductor laser 150. A laser beam transmitted through the optical waveguide 160 contains either a TE or TM polarized light component.

The following is a specific description of the function of the optical isolator 152.

A laser beam emitted from the semiconductor laser 150 is applied to a polarizing plate (not shown) contained in the optical isolator 152. The polarizing plate has a function to transmit only those laser beams which contain polarized light components having their azimuth rotated at 45°. After having its azimuth further rotated for 45° by means of a wavefront rotator (not shown), which is contained in the optical isolator 152, the laser beam transmitted through the polarizing plate is transmitted through the waveguide 160 to the reflector-type directional coupler 161. The azimuth of the laser beam reflected by the coupler 161 is further rotated for 45° by means of the wavefront rotator. At this point of time, the azimuth of the reflected laser beam is deviated 90° from that of the laser beam transmitted through the polarizing plate. Accordingly, the reflected laser beam is intercepted by the polarizing plate. Thus, the semiconductor laser 150 can always steadily supply a laser beams having a fixed polarized light component, without being influenced by the reflected laser beam.

In the present embodiment, the optical isolator 152 is connected to the optical waveguide 160 by means of the optical fibers 153 and 155. Therefore, the waveguide 160 can never be influenced by a magnetic field which is generated by a magnet in the isolator 152.

In the present embodiment, moreover, the two optical fibers 153 and 155 are connected to each other by means of the optical fiber connector 154. Thus, the optical isolator 152 is removable from the substrate 110. Since the isolator 152 has a relatively large size, it is not advisable to mount it integrally on the substrate 110. This is because the isolator 152, which is relatively expensive, must be discarded when the sensing head is scrapped due to a breakage of a probe 122, if the isolator is formed integrally on the substrate 110. Thereupon, the isolator 152 can be separated from the substrate 110 by the use of the reliable optical fiber connector 154 which ensures easy attachment and detachment. If a low-priced, small-sized optical isolator free from an influence of a magnetic field is developed in the future, it will be allowed to be connected directly to the optical waveguide 160.

Referring now to FIG. 8 or 12, a method for manufacturing the aforementioned ridge-type optical waveguide 130, 160 will be described.

First, the convex-shaped silicon substrate 110 (see FIG. 7 or 11) is prepared. The projecting portion of the substrate 110, which is to serve as the cantilever 120, is subjected to anisotropic etching from the lower side of FIG. 8 or 12, so that the substrate is scooped away. The remaining portion, which is called the p-type silicon layer 111 having a predetermined thickness, constitutes a first layer of the displacement sensing head which is provided with the cantilever 120. The buffer layer 112 of silicon oxide is stacked on the first layer by the CVD method. The buffer layer 112 constitutes a second layer of the displacement sensing head. The glass layer 113 is stacked on the second layer by sputtering. The layer 113 is subjected to reactive ion etching (RIE) using a mask. As a result, the convex optical waveguide 130 or 160 is formed.

The structure of the optical waveguides 130 and 160 is not limited to the ridge type, and may be of a flush type or loaded type.

In manufacturing a flush-type optical waveguide, a silicon oxide layer is stacked on a glass pattern (corresponding to the convex optical waveguide) which is prepared by etching the glass layer 113, whereby the glass pattern is buried in the silicon oxide layer.

In the case of the loaded type, a dielectric layer of $Si_3N_4$ is stacked on the glass layer 113 by the CVD method so as to form an optical waveguide pattern. In this case, the laser beam is guided through the optical waveguide in a manner such that it is confined under the dielectric layer.

The layer which forms the glass pattern is not limited to the example described above, and may alternatively be formed of GaAs or the like, that is, any material which enjoys high workability.

Further, the object of application of the present invention is not limited to the AFM (atomic force microscope), and the invention may be applied to the MFM (magnetic force microscope) with the same effects of the embodiments described herein.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A scanning probe microscope comprising:
   a probe supporting member having a free end portion and a fixed end portion the free end portion bearing a probe thereon;
   a laser light source attached to the fixed end portion of the probe supporting member;
   an optical waveguide for guiding a laser beam, emitted from the laser light source, to the free end portion;
   an optical element arranged in the optical waveguide, for dividing the laser beam into laser beams in at least two perpendicular directions;
   a photoelectric transducer for receiving the divided laser beams and for converting the laser beams into electrical output signals corresponding thereto; and
   arithmetic processing means for receiving the electrical signals and subjecting the signals to predetermined arithmetic processing.

2. A scanning probe microscope comprising:
   a probe supporting member having a free end portion and a fixed end portion, the free end portion bearing a probe thereon;
   a laser light source attached to the fixed end portion of the probe supporting member;
   an optical waveguide for guiding a laser beam, emitted from the laser light source, to the free end portion; and
   a photoelectric transducer for receiving the laser beam delivered thereto via the free end portion and for converting the laser beam into an electrical output signal corresponding thereto.

3. A scanning probe microscope comprising:
   a probe supporting member having a free end portion and a fixed end portion, the free end portion bearing a probe thereon;
   a laser light source attached to the fixed end portion of the probe supporting member;
   an optical waveguide for guiding a laser beam, emitted from the laser light source, to an opening in a distal end face of the free end portion;
   a first photoelectric transducer for receiving the laser beam emitted from the opening and converting the laser beam into an electrical output signal;
   an optical element arranged in the optical waveguide, for deflecting the laser beam in a direction perpendicular to the longitudinal axis of the optical waveguide;
   a second photoelectric transducer for receiving the laser beam deflected by means of the optical element and converting the laser beam into an electrical output signal; and
   arithmetic processing means for receiving the electrical signals and subjecting the signals to predetermined arithmetic processing.

4. A scanning probe microscope comprising:
   a probe supporting member having a free end portion and a fixed end portion, the free end portion bearing a probe thereon;
   a laser light source attached to the fixed end portion of the probe supporting member;
   an optical waveguide for guiding a laser beam, emitted from the laser light source, to an opening in a distal end face of the free end portion; and
   a photoelectric transducer for receiving the laser beam emitted from the opening and converting the laser beam into an electrical output signal.

5. A scanning probe microscope according to claim 2, wherein said probe supporting member comprises a cantilever in the form of a thin rectangular plate.

6. A scanning probe microscope according to claim 2, wherein said optical waveguide comprises means for dividing the laser beam guided through the optical waveguide into a center beam and side beams on either side thereof.

7. A scanning probe microscope according to claim 6, wherein the cross-sectional area of said center beam accounts for approximately 70% of the total cross-sectional area of the laser beam guided through the optical waveguide, and that of each said side beam for approximately 15% of the total cross-sectional area.

8. A scanning probe microscope according to claim 7, wherein said optical waveguide includes a half mirror for reflecting part of the center beam in a direction perpendicular to an optical axis of the optical waveguide and for transmitting the remainder in the direction of the optical axis, and a Fresnel lens body for reflecting the center beam transmitted through the half mirror, in a direction perpendicular to the center beam reflected by the half mirror.

9. A scanning probe microscope according to claim 4, wherein said probe supporting member comprises a cantilever in the form of a thin rectangular plate.

10. A scanning probe microscope according to claim 4, wherein said optical waveguide comprises means for dividing the laser beam guided through the optical waveguide into a center beam and side beams on either side thereof.

11. A scanning probe microscope according to claim 10, wherein the cross-sectional area of said center beam accounts for approximately 70% of the total cross-sectional area of the laser beam guided through the optical waveguide, and that of each said side beam for approximately 15% of the total cross-sectional area.

12. A scanning probe microscope according to claim 11, wherein said optical waveguide comprises a half mirror of 50% transmittance for reflecting part of the center beam in a direction perpendicular to the optical axis of the optical waveguide and for transmitting the remainder in the direction of the optical axis.

13. A scanning probe microscope according to claim 11, wherein said optical member comprises a Fresnel lens body of 90° reflection angle for reflecting the center beam transmitted through the half mirror, in a direction perpendicular to the center beam reflected by the half mirror.

14. A scanning probe microscope comprising:
   a probe supporting member having a free end portion and a fixed end portion, the free end portion bearing a probe thereon;
   a laser light source attached to the fixed end portion of the probe supporting member and emitting a laser beam to the free end portion;

an optical element arranged on said free end portion, for dividing the laser beam into laser beams in at least two perpendicular directions;

a photoelectric transducer for receiving the divided laser beams and converting the laser beams into electrical output signals corresponding thereto; and arithmetic processing means for receiving the electrical signals and subjecting the signals to predetermined arithmetic processing.

* * * * *